(12) United States Patent
Cheung et al.

(10) Patent No.: US 10,541,001 B2
(45) Date of Patent: Jan. 21, 2020

(54) VIDEO HIGHLIGHTS

(71) Applicant: Facebook, Inc., Menlo Park, CA (US)

(72) Inventors: Vincent Charles Cheung, San Carlos, CA (US); Hermes Germi Pique Corchs, London (GB); Maria Chiara Cacciani, London (GB); Andrew James Thomas Buckley, Mountain View, CA (US); Stef Marc Smet, London (GB); Milen Georgiev Ozhumerov, Sevenoaks (GB); Mircea-Gabriel Suciu, London (GB); Muhammed Elsayed Muhammed Elsayed Ibrahim, London (GB); Cunpu Bo, Sunnyvale, CA (US)

(73) Assignee: Facebook, Inc., Menlo Park, CA (US)

( * ) Notice: Subject to any disclaimer, the term of this patent is extended or adjusted under 35 U.S.C. 154(b) by 33 days.

(21) Appl. No.: 15/855,290

(22) Filed: Dec. 27, 2017

(65) Prior Publication Data

US 2019/0198057 A1    Jun. 27, 2019

(51) Int. Cl.
| | | |
|---|---|---|
| *G06F 3/00* | (2006.01) |
| *G11B 27/031* | (2006.01) |
| *G06K 9/48* | (2006.01) |
| *G06K 9/00* | (2006.01) |
| *H04L 12/58* | (2006.01) |
| *G06K 9/62* | (2006.01) |
| *G06F 16/738* | (2019.01) |
| *G06F 16/9535* | (2019.01) |
| *G06F 16/783* | (2019.01) |
| *H04L 29/08* | (2006.01) |

(52) U.S. Cl.
CPC .......... *G11B 27/031* (2013.01); *G06F 16/738* (2019.01); *G06F 16/783* (2019.01); *G06F 16/9535* (2019.01); *G06K 9/00711* (2013.01); *G06K 9/481* (2013.01); *G06K 9/6215* (2013.01); *H04L 51/10* (2013.01); *H04L 51/32* (2013.01); *H04L 67/306* (2013.01)

(58) Field of Classification Search
CPC .............. H04N 21/00; G06T 7/00; G06F 3/00
USPC ........................................................ 382/103
See application file for complete search history.

(56) References Cited

U.S. PATENT DOCUMENTS 8,995,823 B2 * 3/2015 O'Kelly ................. G11B 27/28
                                                          386/239

* cited by examiner

*Primary Examiner* — Abolfazl Tabatabai
(74) *Attorney, Agent, or Firm* — Baker Botts L.L.P.

(57) ABSTRACT

In one embodiment, a method includes accessing a video; detecting one or more objects in one or more frames of the video; identifying one or more of the detected objects; determining a relevance score for each of the one or more of the identified objects with respect to a user the video is to be presented to; selecting one or more frames of the video based on the determined relevance scores for the identified objects in the frames; and providing for presentation to the user one or more of the selected frames of the video.

18 Claims, 7 Drawing Sheets

VIDEO HIGHLIGHTS

TECHNICAL FIELD

This disclosure generally relates to videos within a social-networking environment.

BACKGROUND

A social-networking system, which may include a social-networking website, may enable its users (such as persons or organizations) to interact with it and with each other through it. The social-networking system may, with input from a user, create and store in the social-networking system a user profile associated with the user. The user profile may include demographic information, communication-channel information, and information on personal interests of the user. The social-networking system may also, with input from a user, create and store a record of relationships of the user with other users of the social-networking system, as well as provide services (e.g., wall posts, photo-sharing, event organization, messaging, games, or advertisements) to facilitate social interaction between or among users.

The social-networking system may send over one or more networks content or messages related to its services to a mobile or other computing device of a user. A user may also install software applications on a mobile or other computing device of the user for accessing a user profile of the user and other data within the social-networking system. The social-networking system may generate a personalized set of content objects to display to a user, such as a newsfeed of aggregated stories of other users connected to the user.

SUMMARY OF PARTICULAR EMBODIMENTS

In particular embodiments, a highlight may be generated or selected from a video based on object recognition. A highlight of a video may include frames or portions of a video that have a higher likelihood to be interesting, enticing, appealing, or relevant to a particular user. One or more objects in one or more frames of a video may be detected and identified. A relevancy of the identified objects to a particular user may be determined (e.g., calculating a relevancy-score of the identified objects with respect to the user). A highlight from the video may be generated or selected by selecting one or more frames of the video based on the relevance of identified objects in the one or more frames to the user. A highlight comprising one or more of the selected frames may be provided for presentation to the user. Although this disclosure may describe a particular method for generating or selecting a highlight of a video, this disclosure contemplates generating or selecting a highlight of a video in any suitable manner.

The embodiments disclosed herein are only examples, and the scope of this disclosure is not limited to them. Particular embodiments may include all, some, or none of the components, elements, features, functions, operations, or steps of the embodiments disclosed above. Embodiments according to the invention are in particular disclosed in the attached claims directed to a method, a storage medium, a system and a computer program product, wherein any feature mentioned in one claim category, e.g. method, can be claimed in another claim category, e.g. system, as well. The dependencies or references back in the attached claims are chosen for formal reasons only. However any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

DESCRIPTION OF EXAMPLE EMBODIMENTS

In particular embodiments, a highlight may be generated or selected from a video based on object recognition. A highlight of a video may include frames or portions of a video that have a higher likelihood to be interesting, enticing, appealing, or relevant to a particular user. One or more objects in one or more frames of a video may be detected and identified. A relevancy of the identified objects to a particular user may be determined (e.g., calculating a relevance score of the identified objects with respect to the user). A highlight from the video may be generated or selected by selecting one or more frames of the video based on the relevance of identified objects in the one or more frames to the user. A highlight comprising one or more of the selected frames may be provided for presentation to the user. Although this disclosure may describe a particular method for generating or selecting a highlight of a video, this disclosure contemplates generating or selecting a highlight of a video in any suitable manner.

In particular embodiments, social-networking system 560 may access a video. A video may comprise a plurality of frames (e.g., a plurality of still images). As an example and not by way of limitation, a video may be represented by a video file (e.g., MP4, WMV, AVI, etc.) comprising video data in a video format (e.g., VP9, HEVC/H.265, etc.). In particular embodiments, a video may comprise audio. As an example and not by way of limitation, a video may be represented by a video file comprising audio data in an audio format (e.g., MP3, AAC, Vorbis, FLAC, Opus, etc.). Although this disclosure focuses on frames of a video, this disclosure contemplates any suitable media item (e.g., animated GIFs, slideshows, etc.).

Figure 1:
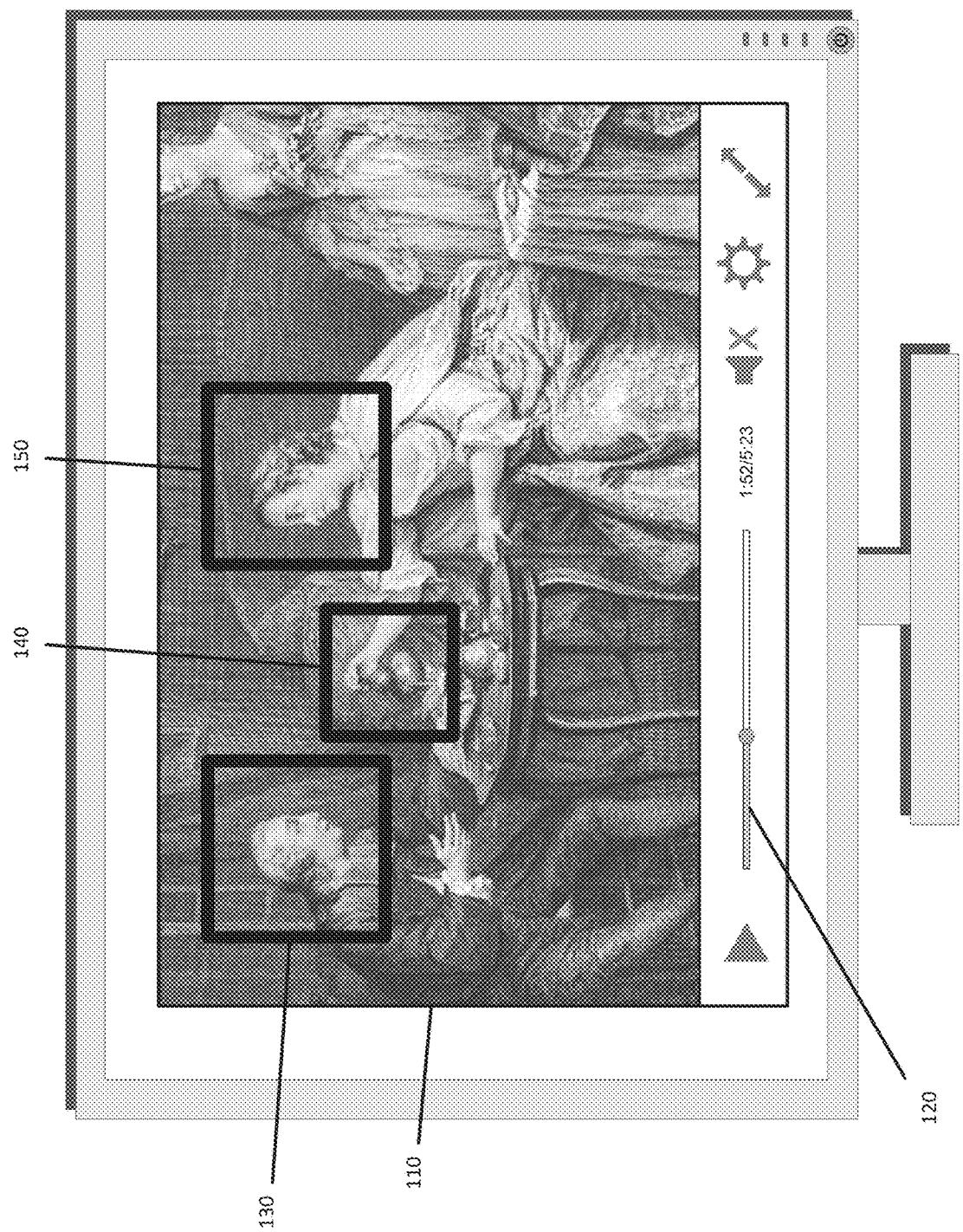
FIG. 1 illustrates an example of detecting and identifying one or more objects in an example frame of an example video.

FIG. 1 illustrates an example of detecting and identifying one or more objects in an example frame of an example video 110. FIG. 1 may illustrate a frame of example video 110. FIG. 1 may depict the example frame of video 110 in a media player comprising scrubber 120. Scrubber 120 may indicate the relative position of the frame in the timeline of video 110. Although this disclosure describes detecting or identifying objects in a particular frame of a particular video, this disclosure contemplates detecting or identifying objects any suitable frame of any suitable video. Further, although FIG. 1 may illustrate a frame of a video in a media player, this is for illustrative purposes only, as a video may be accessed in any suitable manner.

In particular embodiments, social-networking system 560 may detect one or more objects in one or more frames of the video. As an example and not by way of limitation, social-networking system 560 may detect objects 130, 140, and 150 in the example frame of video 110. Detecting an object in a frame may comprise determining the existence of an object, the location of an object (e.g., coordinates of the object in the frame), or a perimeter of an object. An object in a video may correspond to a physical object depicted in the video. As an example and not by way of limitation, an object in a video may be a user, a face, an animal, a physical object, or any other suitable object. In particular embodiments, objects may be detected or identified using machine learning techniques. As an example and not by way of limitation, social-networking system 560 may use a convolutional neural network trained to detect objects in an image. In particular embodiments, an object may be detected based on user input. As an example and not by way of limitation, social-networking system 560 may prompt a user to indicate that an object is in a frame. The user may provide input to social-networking system 560 that an object is located in a frame (e.g., by clicking or tapping on an object in a frame when prompted). Although this disclosure describes detecting objects in a particular manner, this disclosure contemplates detecting objects in any suitable manner.

In particular embodiments, social-networking system 560 may identify one or more of the detected objects. In particular embodiments, social-networking system 560 may use an automated process to identify objects (e.g., machine learning). In particular embodiments, social-networking system 560 may identify objects based on user input. As an example and not by way of limitation, social-networking system 560 may display a frame for one or more users and prompt the users to tag one or more objects in the frame. A user may provide input that identifies an object (e.g., by providing a description of an object). Social-networking system 560 may present to users one or more candidate identifications of an object. As an example and not by way of limitation, social-networking system 560 may present to a user a list of the closest matches to the object (e.g., as determined by machine learning, based on social networking information associated with the user or the video, etc.). In particular embodiments, object tracking may be used to identify an object in one frame to based on an identification of an object in another frame. As an example and not by way of limitation, if a detected object in a frame has a similar relative position to a detected object in an adjacent frame, the object in the frame and the object in the adjacent frame may represent the same object. An identification of the object in the frame may be used to identify the object in the adjacent frame. In particular embodiments, identification of an object may comprise information identifying a location of an object in a frame, a description of an object, a label associated with an object, a node or edge in a social graph corresponding to the object, an object type of an object, or any other suitable information. As an example and not by way of limitation, referencing FIG. 1, social-networking system 560 may identify object 130 as user "Jacques," object 140 as a tea pot, and object 160 as user "Cécile." Although this disclosure describes identifying objects in a particular manner, this disclosure contemplates identifying objects in any suitable manner.

In particular embodiments, object identification may be based on an audio portion of a video. As an example and not by way of limitation, a person giving a speech may appear in a video. In some frames depicting the person, the person's face may be visible and social-networking system 560 may identify the person based on facial recognition. In frames where the person's face is not visible (e.g., the person turns away from the camera), the audio portion of the video may indicate that the person is still featured in that frame of the video (e.g., the person is speaking). In particular embodiments, metadata or other information associated with the video may be used to identify objects. As an example and not by way of limitation, a video may be associated with user-created tags that indicate that particular objects are depicted in the video (e.g., a user tags a particular person in a video). In embodiments where objects are identified by an automated process, the automated process may be more likely to identify an object as the particular object associated with the user-created tag (e.g., assigning the identification a higher probability, reducing a threshold for the identification, etc.). Although this disclosure describes identifying objects in a particular manner, this disclosure contemplates identifying objects in any suitable manner.

In particular embodiments, object detection and objection identification may be performed by different computer systems. As an example and not by way of limitation, a video may be on a client system. The client system may detect one or more objects in one or more frames of the video. The client system may detect objects in each frame of the video, detect objects in frames of the video at a particular interval (e.g., detect objects every 100 milliseconds of the video), or in any other suitable manner. In particular embodiments, the client system may perform object tracking and select a representative frame depicting a tracked object. For example, if a tracked object appears in 100 frames of the video, the client system may select one of the 100 frames as a representative frame. The client system may send representative frames to an identification server for identification. The identification server may identify objects in the representative frames and send the identification to the client system. The client system may apply the identification of a tracked object in a representative frame to other frames depicting the same tracked object. In particular embodiments, a representative frame may be selected based on the quality of the frame with respect to an object. As an example and not by way of limitation, if a face of a person appears in multiple frames of a video, a representative frame may be a frame where the person is smiling, where the person's eyes are open, etc. As another example and not by way of limitation, a representative frame may be selected based on how blurry or in-focus the frame is. In particular embodiments, selecting a representative frame based on the quality of the frame may be done by automatic image recognition (e.g., machine learning) or based on user input (e.g., prompting the user to indicate a high quality representative frame). Although this disclosure describes performing object identification, detection, and/or tracking being using particular computer systems, this disclosure contemplates that object identification, detection, and/or tracking may be performed by any one computer system or any combination of suitable computer systems.

In particular embodiments, in connection with detecting or identifying objects, social-networking system 560 may utilize one or more systems, components, elements, functions, methods, operations, or steps disclosed in U.S. Patent Application 62/351,851, filed 17 Jun. 2016, which is incorporated by reference.

In particular embodiments, social-networking system 560 may determine a relevance score for each of the one or more identified objects with respect to a user the video is to be presented to. As an example and not by way of limitation, a user of social-networking system 560 may be viewing a newsfeed comprising video to be presented to the user. As another example and not by way of limitation, a user may be viewing a website or interface of an application that includes a video advertisement to be presented to the user. As another example and not by way of limitation, a notification comprising video to be displayed to the user may be sent to a client system of the user. Although this disclosure describes particular video to be presented to a user, this disclosure contemplates any suitable video to be presented to a user.

In particular embodiments, a relevance score for an object with respect to a user may represent how relevant that object is to a user. As an example and not by way of limitation, a relevance score may range from 0.0 to 1.0, where a higher relevance score for an object may indicate that the object has more relevance to a user. This relevance score range is for illustrative purposes only; this disclosure contemplates any suitable range or measure of relevance scores (e.g., a lower score may indicate more relevance, the score may range between any suitable values, etc.). In particular embodiments, a relevance score with respect to the user may be based on social-networking information associated with the user and social-networking information associated with the identified object. As an example and not by way of limitation, social-networking information may indicate that a user to be presented with video 110 is friends with Jacques. Social-networking information may also indicate that the user has a preference for tea. For example, the user may have posted "nothing like a fresh pot of tea in the morning" and may have liked several makers of green tea. Social-networking information may indicate that the user has little connection or overlapping interests with Cécile. Based on the social-networking information, object 130, depicting Jacques, and object 140, depicting a pot of tea, may have a higher determined relevance score than object 160, depicting Cécile. Although this disclosure describes determining a relevance score in a particular manner, this disclosure contemplates determining a relevance score in any suitable manner.

In particular embodiments, determining the relevance score for an identified object with respect to the user may be based on an affinity coefficient. The user may be a user of an online social network. The online social network may comprise a social graph. A first node may correspond to the user and a second node may correspond to the identified object. As an example and not by way of limitation, the relevance score may be proportional to the affinity coefficient. As another example and not by way of limitation, the relevance score may be determined by using the affinity coefficient as one of several weighted factors. In particular embodiments, determining the relevance score for an identified object with respect to the user may be based on a degree of separation between the first node corresponding to the user and the second node corresponding to the identified object. As an example and not by way of limitation, an object corresponding to a node with a fewer degrees of separation to the node representing the user may be determined to be more relevant to the user than an object corresponding to a node with a more degrees of separation to the node representing the user. Although this disclosure describes determining a relevance score in a particular manner, this disclosure contemplates determining a relevance score in any suitable manner.

In particular embodiments, determining the relevance score for an identified object with respect to the user may be based on a similarity metric between a feature vector representing the user and a feature vector representing the identified object. As an example and not by way of limitation, the user may be represented by a first feature vector and the identified object may be represented by a second feature vector. A similarity metric of the feature vector representing the user and the feature vector representing the object may be used as a factor in determining the relevance score of the object with respect to the user. As another example and not by way of limitation, social-networking system 560 may use a similarity metric between a reconstructed embedding of an object representing the user and a reconstructed embedding of an object representing Cécile to determine the relevance score of object 160, depicting Cécile, with respect to the user. In connection with reconstructed embeddings, particular embodiments may utilize one or more systems, components, elements, functions, methods, operations, or steps disclosed in U.S. patent application Ser. No. 15/286,315, filed 5 Oct. 2016, which is incorporated by reference. Although this disclosure describes determining a relevance score in a particular manner, this disclosure contemplates determining a relevance score in any suitable manner.

Figure 2:
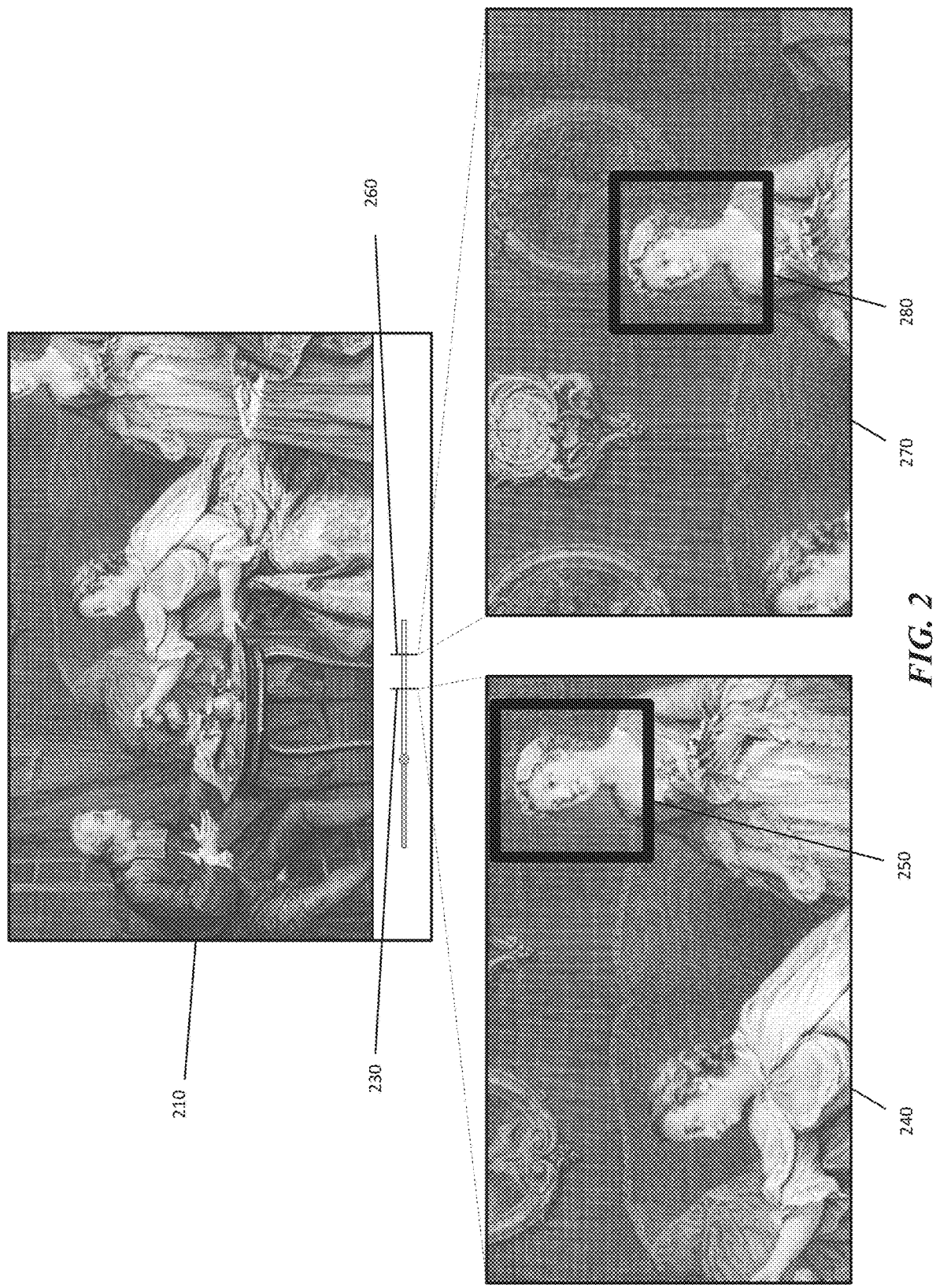
FIG. 2 illustrates an example of selecting one or more frames of an example video based on relevance scores for the identified objects in the frames.

FIG. 2 illustrates an example selection of one or more frames of video 210. In particular embodiments, social-networking system 560 may select one or more frames of the video based on the determined relevance scores for the identified objects in the frames. The example in FIG. 2 illustrates a selection of frames 240 and 270. Frame 240 may be the frame displayed at time 230 and frame 260 may be the frame displayed at time 260. Frames 240 and 270 may have been selected based on the determined relevance score of objects in the frames. As an example and not by way of limitation, frames of a video with objects having relatively high relevance scores may be selected. In FIG. 2, object 250 and object 280 may depict Annabelle. The user may be friends with Annabelle on an online social network, and objects 250 and 280 may have a high relevance score based on the friendship between the user and Annabelle. Frames 240 and 270 may be selected based on determining that the frames each have an object with a high relevance score. In particular embodiments, selecting frames may comprise selecting each frame depicting an identified object with a relevance score greater than a threshold relevance score. As an example and not by way of limitation, if relevance scores of objects range from 0 to 100, each frame depicting an object with a relevance score of 75 or greater may be selected. In particular embodiments, selected frames may contiguous (e.g., each selected frame may be temporally located next to another selected frame in the video) or selected frames may be noncontiguous (e.g., the first and last frames of a video, but not frames in between). In particular embodiments, social-networking system 560 may select a particular ratio of the frames of the video to the total number of frames in the video (e.g., 10% of the frames) or select at most a particular ratio of the frames of the video (e.g., select at most 15% of the frames). In particular embodiments, social-networking system 560 may select frames of a video based on a particular duration (e.g., select frames that have a combined duration of 1 minute of the video, select frames that have at most a combined duration of 30 seconds of the video, etc.). Although this disclosure describes selecting frames of a video in a particular manner, this disclosure contemplates selecting frames of a video in any suitable manner.

In particular embodiments, social-networking system 560 may determine a relevance score for each of the one or more frames of the video based on the relevance scores for each identified object in the frame. Selecting frames of the video may be based on the respective relevance scores of the frames. As an example and not by way of limitation, referencing FIG. 1, object 130 may have a relevance score of 0.4, object 140 may have a relevance score of 0.2, and object 150 may have a relevance score of 0.3. A relevance score for the frame in FIG. 1 may be determined based on a sum of the relevance scores for each identified object in the frame, in this example, a sum of 0.9. As another example and not by way of limitation, object 130 may have a relevance score of 7, object 140 may have a relevance score of 3, and object 150 may have a relevance score of 1. A relevance score for the frame in FIG. 1 may be determined based on the object in the frame with the highest relevance score, in this example, the relevance score of 7 for object 130. Although this disclosure describes determining a relevance score for a frame in a particular manner, this disclosure contemplates determining a relevance score for a frame in any suitable manner.

In particular embodiments, social-networking system 560 may provide for presentation to the user one or more of the selected frames of the video. As an example and not by way of limitation, referencing FIG. 2, each frame between frames 240 and 270 may be selected, inclusive of frames 240 and 270. Social-networking system 560 may present a video to the user comprising the selected frames. The selected frames presented to the user may include audio associated with the selected frames or the frames may be presented to the user without associated audio. The selected frames may be provided in any suitable context (e.g., in a news feed, in a wall feed, in a notification, in a mobile phone application, etc.). The frames may be presented to the user in a second video. As an example and not by way of limitation, referencing FIG. 2, each frame between frames 240 and 270 may have been selected, inclusive. Social-networking system 560 may present a second video to the user comprising each frame between frames 240 and 270, inclusive. As another example and not by way of limitation, social-networking system 560 may provide to the user a second video comprising the selected frames of a first video as the user is viewing a news feed of an online social network. The user may be able play the first video by interacting with the second video (e.g., by clicking on the second video). In particular embodiments, social-networking system 560 may provide an indication that the selected frames are a portion of a video and prompt the user to view the video. As an example and not by way of limitation, the selected frames may be provided along with a link displaying the text "show more" that links to the video. In particular embodiments, presenting the selected frames may comprise presenting the video at a starting point corresponding to a selected frame. Although this disclosure describes presenting selected frames in a particular manner, this disclosure contemplates presenting selected frames in any suitable manner.

Figure 3:
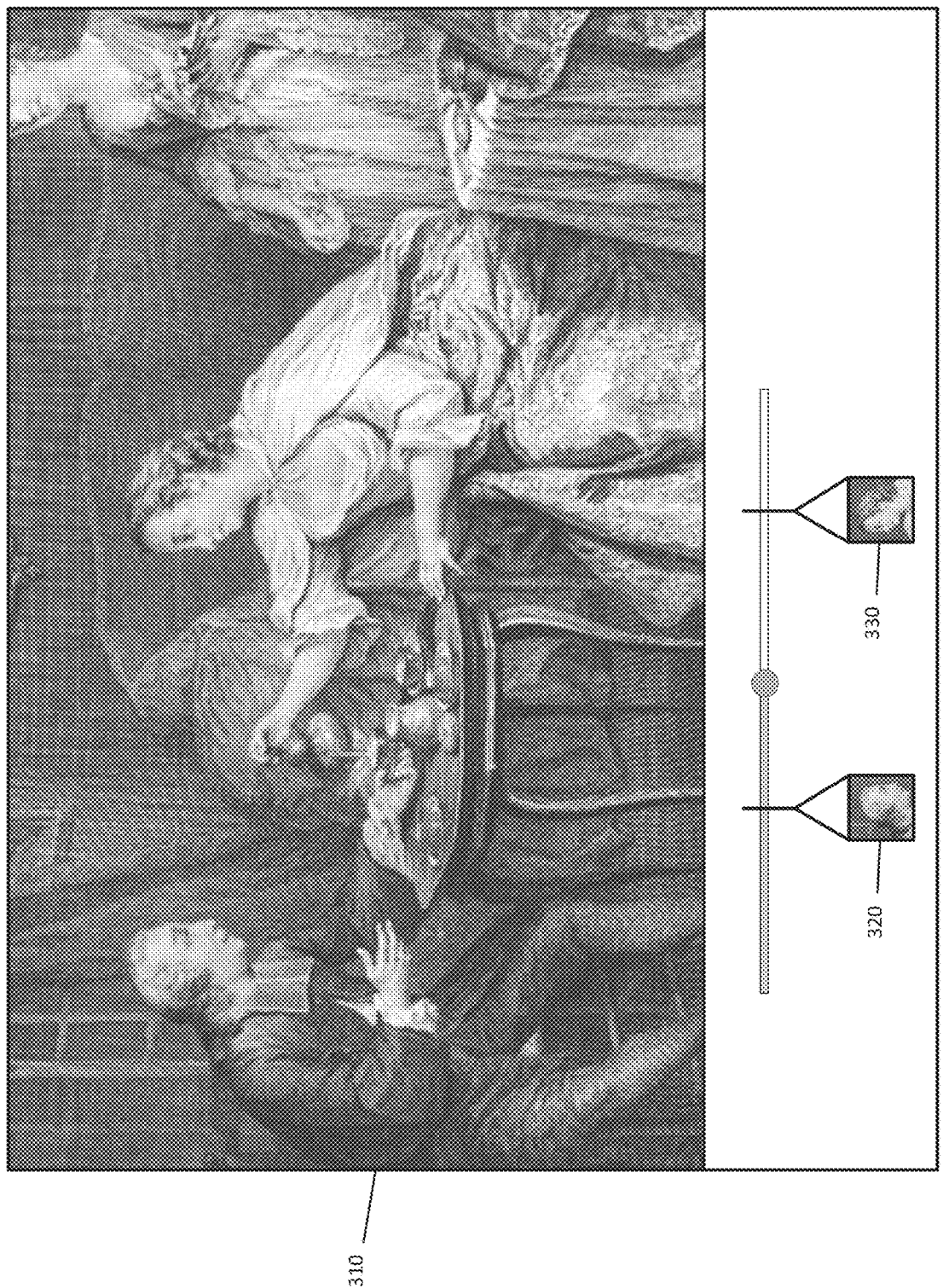
FIG. 3 illustrates an example media player with thumbnails.

FIG. 3 illustrates an example media player with thumbnails. In particular embodiments, selected frames of a video may be provided for presentation to a user using a media player. A media player provided to a user may include thumbnails corresponding to one or more frames of video 310 based on the relevance scores for objects in the frames. As an example and not by way of limitation, thumbnails 320 and 330 may comprise images of objects in frames of the video. In particular embodiments, the images of an object used in a thumbnails may be the image of the object in a representative frame depicting the object. The location of a thumbnail in the media player may indicate the frame depicting the object corresponding to the thumbnail (e.g., the location of the thumbnail on the scrubber of the media player). A user may be able to select a thumbnail (e.g., by clicking on a thumbnail), and the media player may play video 310 starting at the frame corresponding to the selected thumbnail. Although this disclosure may describe providing a thumbnail corresponding to a frame based on relevance scores of an object depicted in the frame in a particular manner, this disclosure contemplates providing a thumbnail corresponding to a frame based on relevance scores of an object depicted in the frame in any suitable manner.

Figure 4:
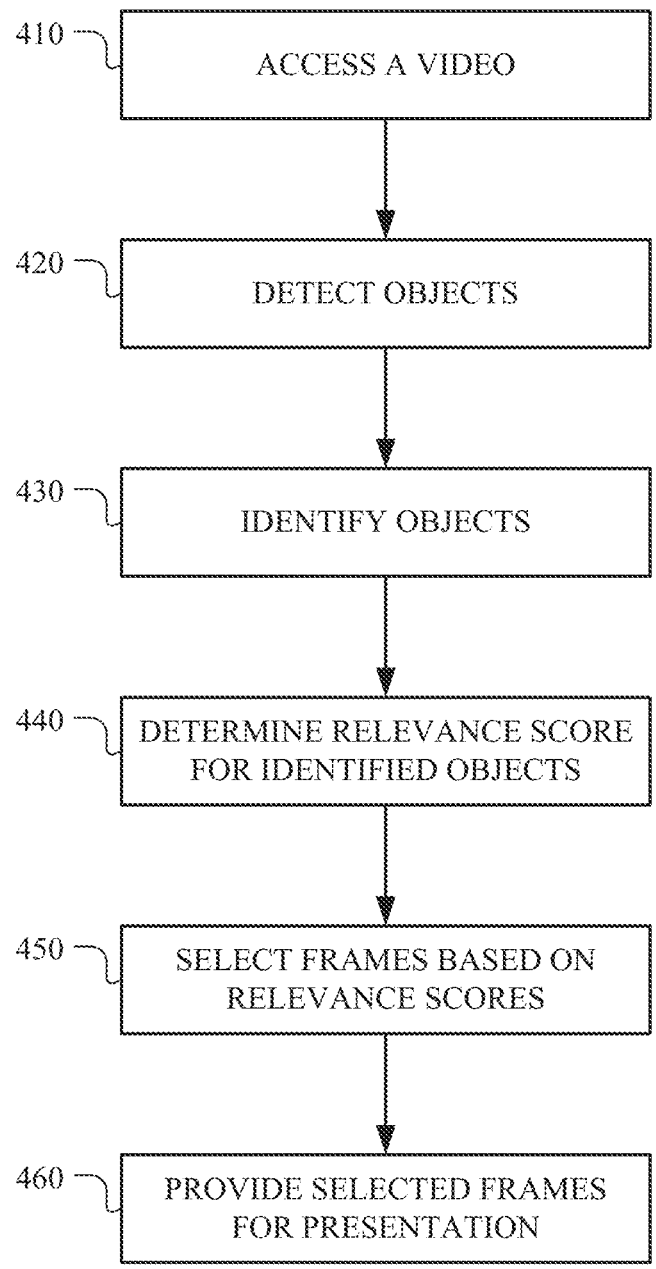
FIG. 4 illustrates an example method for selecting frames of a video based on the relevance of objects in the frames with respect to a user.

FIG. 4 illustrates an example method 400 for selecting frames of a video based on the relevance of objects in the frames with respect to a user. The method may begin at step 410, where one or more computing devices may access a video. At step 420, one or more computing devices may detect one or more objects in one or more frames of the video. At step 430, one or more computing devices may identify one or more of the detected objects. At step 440, one or more computing devices may determine a relevance score for each of the one or more of the identified objects with respect to a user the video is to be presented to. At step 450, one or more computing devices may select one or more frames of the video based on the determined relevance scores for the identified objects in the frames. At step 460, one or more computing devices may provide for presentation to the user one or more of the selected frames of the video. Particular embodiments may repeat one or more steps of the method of FIG. 4, where appropriate. Although this disclosure describes and illustrates particular steps of the method of FIG. 4 as occurring in a particular order, this disclosure contemplates any suitable steps of the method of FIG. 4 occurring in any suitable order. Moreover, although this disclosure describes and illustrates an example method for selecting frames of a video based on the relevance of objects in the frames with respect to a user including the particular steps of the method of FIG. 4, this disclosure contemplates any suitable method for selecting frames of a video based on the relevance of objects in the frames with respect to a user including any suitable steps, which may include all, some, or none of the steps of the method of FIG. 4, where appropriate. Furthermore, although this disclosure describes and illustrates particular components, devices, or systems carrying out particular steps of the method of FIG. 4, this disclosure contemplates any suitable combination of any suitable components, devices, or systems carrying out any suitable steps of the method of FIG. 4.

Figure 5:
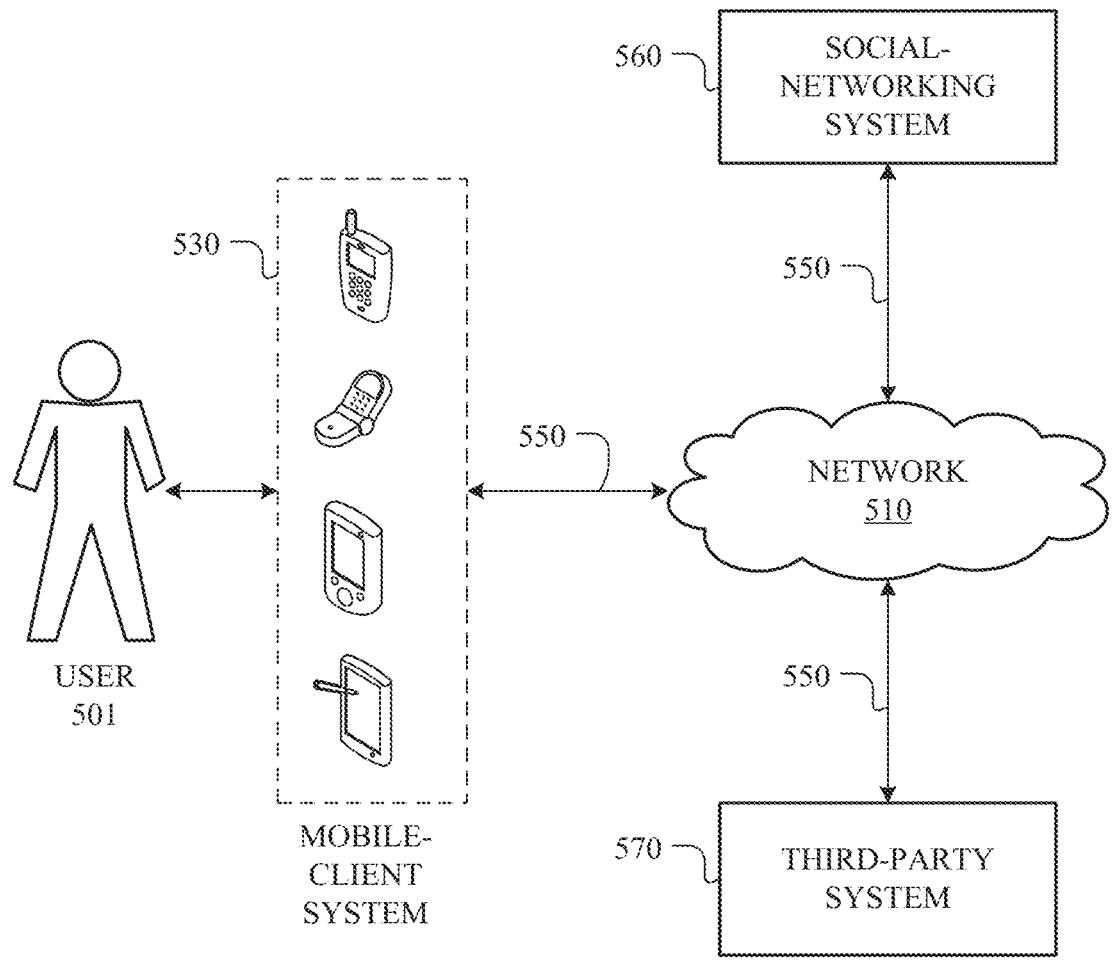
FIG. 5 illustrates an example network environment associated with a social-networking system.

FIG. 5 illustrates an example network environment 500 associated with a social-networking system. Network environment 500 includes a user 501, a client system 530, a social-networking system 560, and a third-party system 570 connected to each other by a network 510. Although FIG. 5 illustrates a particular arrangement of user 501, client system 530, social-networking system 560, third-party system 570, and network 510, this disclosure contemplates any suitable arrangement of user 501, client system 530, social-networking system 560, third-party system 570, and network 510. As an example and not by way of limitation, two or more of client system 530, social-networking system 560, and third-party system 570 may be connected to each other directly, bypassing network 510. As another example, two or more of client system 530, social-networking system 560, and third-party system 570 may be physically or logically co-located with each other in whole or in part. Moreover, although FIG. 5 illustrates a particular number of users 501, client systems 530, social-networking systems 560, third-party systems 570, and networks 510, this disclosure contemplates any suitable number of users 501, client systems 530, social-networking systems 560, third-party systems 570, and networks 510. As an example and not by way of limitation, network environment 500 may include multiple users 501, client system 530, social-networking systems 560, third-party systems 570, and networks 510.

In particular embodiments, user 501 may be an individual (human user), an entity (e.g., an enterprise, business, or third-party application), or a group (e.g., of individuals or entities) that interacts or communicates with or over social-networking system 560. In particular embodiments, social-networking system 560 may be a network-addressable computing system hosting an online social network. Social-networking system 560 may generate, store, receive, and send social-networking data, such as, for example, user-profile data, concept-profile data, social-graph information, or other suitable data related to the online social network. Social-networking system 560 may be accessed by the other components of network environment 500 either directly or via network 510. In particular embodiments, social-networking system 560 may include an authorization server (or other suitable component(s)) that allows users 501 to opt in to or opt out of having their actions logged by social-networking system 560 or shared with other systems (e.g., third-party systems 570), for example, by setting appropriate privacy settings. A privacy setting of a user may determine what information associated with the user may be logged, how information associated with the user may be logged, when information associated with the user may be logged, who may log information associated with the user, whom information associated with the user may be shared with, and for what purposes information associated with the user may be logged or shared. Authorization servers may be used to enforce one or more privacy settings of the users of social-networking system 30 through blocking, data hashing, anonymization, or other suitable techniques as appropriate. Third-party system 570 may be accessed by the other components of network environment 500 either directly or via network 510. In particular embodiments, one or more users 501 may use one or more client systems 530 to access, send data to, and receive data from social-networking system 560 or third-party system 570. Client system 530 may access social-networking system 560 or third-party system 570 directly, via network 510, or via a third-party system. As an example and not by way of limitation, client system 530 may access third-party system 570 via social-networking system 560. Client system 530 may be any suitable computing device, such as, for example, a personal computer, a laptop computer, a cellular telephone, a smartphone, a tablet computer, or an augmented/virtual reality device.

This disclosure contemplates any suitable network 510. As an example and not by way of limitation, one or more portions of network 510 may include an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, or a combination of two or more of these. Network 510 may include one or more networks 510.

Links 550 may connect client system 530, social-networking system 560, and third-party system 570 to communication network 510 or to each other. This disclosure contemplates any suitable links 550. In particular embodiments, one or more links 550 include one or more wireline (such as for example Digital Subscriber Line (DSL) or Data Over Cable Service Interface Specification (DOCSIS)), wireless (such as for example Wi-Fi or Worldwide Interoperability for Microwave Access (WiMAX)), or optical (such as for example Synchronous Optical Network (SONET) or Synchronous Digital Hierarchy (SDH)) links. In particular embodiments, one or more links 550 each include an ad hoc network, an intranet, an extranet, a VPN, a LAN, a WLAN, a WAN, a WWAN, a MAN, a portion of the Internet, a portion of the PSTN, a cellular technology-based network, a satellite communications technology-based network, another link 550, or a combination of two or more such links 550. Links 550 need not necessarily be the same throughout network environment 500. One or more first links 550 may differ in one or more respects from one or more second links 550.

Figure 6:
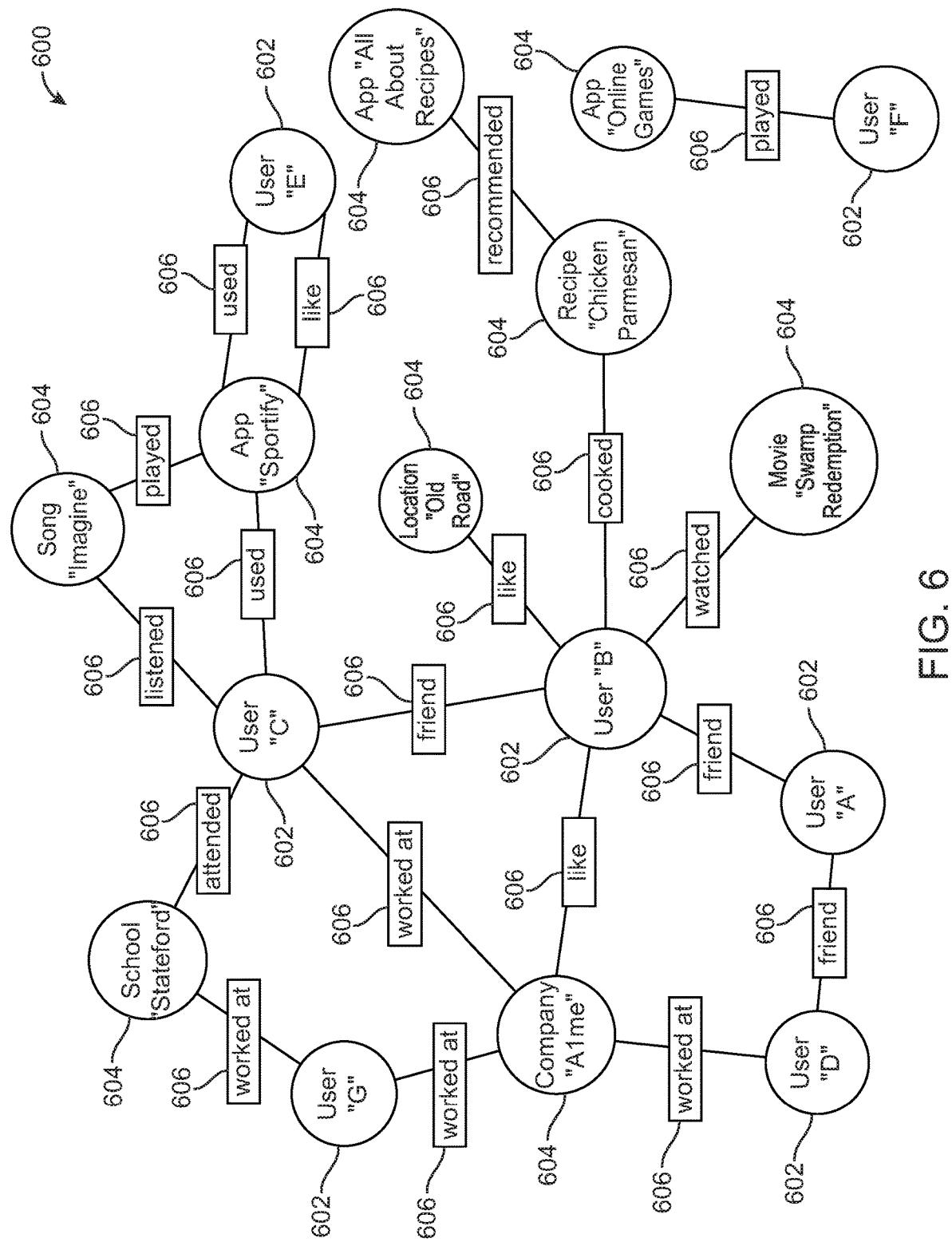
FIG. 6 illustrates an example social graph.

FIG. 6 illustrates example social graph 600. In particular embodiments, social-networking system 560 may store one or more social graphs 600 in one or more data stores. In particular embodiments, social graph 600 may include multiple nodes—which may include multiple user nodes 602 or multiple concept nodes 604—and multiple edges 606 connecting the nodes. Example social graph 600 illustrated in FIG. 6 is shown, for didactic purposes, in a two-dimensional visual map representation. In particular embodiments, a social-networking system 560, client system 530, or third-party system 570 may access social graph 600 and related social-graph information for suitable applications. The nodes and edges of social graph 600 may be stored as data objects, for example, in a data store (such as a social-graph database). Such a data store may include one or more searchable or queryable indexes of nodes or edges of social graph 600.

In particular embodiments, a user node 602 may correspond to a user of social-networking system 560. As an example and not by way of limitation, a user may be an individual (human user), an entity (e.g., an enterprise, business, or third-party application), or a group (e.g., of individuals or entities) that interacts or communicates with or over social-networking system 560. In particular embodiments, when a user registers for an account with social-networking system 560, social-networking system 560 may create a user node 602 corresponding to the user, and store the user node 602 in one or more data stores. Users and user nodes 602 described herein may, where appropriate, refer to registered users and user nodes 602 associated with registered users. In addition or as an alternative, users and user nodes 602 described herein may, where appropriate, refer to users that have not registered with social-networking system 560. In particular embodiments, a user node 602 may be associated with information provided by a user or information gathered by various systems, including social-networking system 560. As an example and not by way of limitation, a user may provide his or her name, profile picture, contact information, birth date, sex, marital status, family status, employment, education background, preferences, interests, or other demographic information. In particular embodiments, a user node 602 may be associated with one or more data objects corresponding to information associated with a user. In particular embodiments, a user node 602 may correspond to one or more webpages.

In particular embodiments, a concept node 604 may correspond to a concept. As an example and not by way of limitation, a concept may correspond to a place (such as, for example, a movie theater, restaurant, landmark, or city); a website (such as, for example, a website associated with social-network system 560 or a third-party website associated with a web-application server); an entity (such as, for example, a person, business, group, sports team, or celebrity); a resource (such as, for example, an audio file, video file, digital photo, text file, structured document, or application) which may be located within social-networking system 560 or on an external server, such as a web-application server; real or intellectual property (such as, for example, a sculpture, painting, movie, game, song, idea, photograph, or written work); a game; an activity; an idea or theory; an object in a augmented/virtual reality environment; another suitable concept; or two or more such concepts. A concept node 604 may be associated with information of a concept provided by a user or information gathered by various systems, including social-networking system 560. As an example and not by way of limitation, information of a concept may include a name or a title; one or more images (e.g., an image of the cover page of a book); a location (e.g., an address or a geographical location); a website (which may be associated with a URL); contact information (e.g., a phone number or an email address); other suitable concept information; or any suitable combination of such information. In particular embodiments, a concept node 604 may be associated with one or more data objects corresponding to information associated with concept node 604. In particular embodiments, a concept node 604 may correspond to one or more webpages.

In particular embodiments, a node in social graph 600 may represent or be represented by a webpage (which may be referred to as a "profile page"). Profile pages may be hosted by or accessible to social-networking system 560. Profile pages may also be hosted on third-party websites associated with a third-party system 570. As an example and not by way of limitation, a profile page corresponding to a particular external webpage may be the particular external webpage and the profile page may correspond to a particular concept node 604. Profile pages may be viewable by all or a selected subset of other users. As an example and not by way of limitation, a user node 602 may have a corresponding user-profile page in which the corresponding user may add content, make declarations, or otherwise express himself or herself. As another example and not by way of limitation, a concept node 604 may have a corresponding concept-profile page in which one or more users may add content, make declarations, or express themselves, particularly in relation to the concept corresponding to concept node 604.

In particular embodiments, a concept node 604 may represent a third-party webpage or resource hosted by a third-party system 570. The third-party webpage or resource may include, among other elements, content, a selectable or other icon, or other inter-actable object (which may be implemented, for example, in JavaScript, AJAX, or PHP codes) representing an action or activity. As an example and not by way of limitation, a third-party webpage may include a selectable icon such as "like," "check-in," "eat," "recommend," or another suitable action or activity. A user viewing the third-party webpage may perform an action by selecting one of the icons (e.g., "check-in"), causing a client system 530 to send to social-networking system 560 a message indicating the user's action. In response to the message, social-networking system 560 may create an edge (e.g., a check-in-type edge) between a user node 602 corresponding to the user and a concept node 604 corresponding to the third-party webpage or resource and store edge 606 in one or more data stores.

In particular embodiments, a pair of nodes in social graph 600 may be connected to each other by one or more edges 606. An edge 606 connecting a pair of nodes may represent a relationship between the pair of nodes. In particular embodiments, an edge 606 may include or represent one or more data objects or attributes corresponding to the relationship between a pair of nodes. As an example and not by way of limitation, a first user may indicate that a second user is a "friend" of the first user. In response to this indication, social-networking system 560 may send a "friend request" to the second user. If the second user confirms the "friend request," social-networking system 560 may create an edge 606 connecting the first user's user node 602 to the second user's user node 602 in social graph 600 and store edge 606 as social-graph information in one or more of data stores 464. In the example of FIG. 6, social graph 600 includes an edge 606 indicating a friend relation between user nodes 602 of user "A" and user "B" and an edge indicating a friend relation between user nodes 602 of user "C" and user "B." Although this disclosure describes or illustrates particular edges 606 with particular attributes connecting particular user nodes 602, this disclosure contemplates any suitable edges 606 with any suitable attributes connecting user nodes 602. As an example and not by way of limitation, an edge 606 may represent a friendship, family relationship, business or employment relationship, fan relationship (including, e.g., liking, etc.), follower relationship, visitor relationship (including, e.g., accessing, viewing, checking-in, sharing, etc.), subscriber relationship, superior/subordinate relationship, reciprocal relationship, non-reciprocal relationship, another suitable type of relationship, or two or more such relationships. Moreover, although this disclosure generally describes nodes as being connected, this disclosure also describes users or concepts as being connected. Herein, references to users or concepts being connected may, where appropriate, refer to the nodes corresponding to those users or concepts being connected in social graph 600 by one or more edges 606.

In particular embodiments, an edge 606 between a user node 602 and a concept node 604 may represent a particular action or activity performed by a user associated with user node 602 toward a concept associated with a concept node 604. As an example and not by way of limitation, as illustrated in FIG. 6, a user may "like," "attended," "played," "listened," "cooked," "worked at," or "watched" a concept, each of which may correspond to an edge type or subtype. A concept-profile page corresponding to a concept node 604 may include, for example, a selectable "check in" icon (such as, for example, a clickable "check in" icon) or a selectable "add to favorites" icon. Similarly, after a user clicks these icons, social-networking system 560 may create a "favorite" edge or a "check in" edge in response to a user's action corresponding to a respective action. As another example and not by way of limitation, a user (user "C") may listen to a particular song ("Imagine") using a particular application (SPOTIFY, which is an online music application). In this case, social-networking system 560 may create a "listened" edge 606 and a "used" edge (as illustrated in FIG. 6) between user nodes 602 corresponding to the user and concept nodes 604 corresponding to the song and application to indicate that the user listened to the song and used the application. Moreover, social-networking system 560 may create a "played" edge 606 (as illustrated in FIG. 6) between concept nodes 604 corresponding to the song and the application to indicate that the particular song was played by the particular application. In this case, "played" edge 606 corresponds to an action performed by an external application (SPOTIFY) on an external audio file (the song "Imagine"). Although this disclosure describes particular edges 606 with particular attributes connecting user nodes 602 and concept nodes 604, this disclosure contemplates any suitable edges 606 with any suitable attributes connecting user nodes 602 and concept nodes 604. Moreover, although this disclosure describes edges between a user node 602 and a concept node 604 representing a single relationship, this disclosure contemplates edges between a user node 602 and a concept node 604 representing one or more relationships. As an example and not by way of limitation, an edge 606 may represent both that a user likes and has used at a particular concept. Alternatively, another edge 606 may represent each type of relationship (or multiples of a single relationship) between a user node 602 and a concept node 604 (as illustrated in FIG. 6 between user node 602 for user "E" and concept node 604 for "SPOTIFY").

In particular embodiments, social-networking system 560 may create an edge 606 between a user node 602 and a concept node 604 in social graph 600. As an example and not by way of limitation, a user viewing a concept-profile page (such as, for example, by using a web browser or a special-purpose application hosted by the user's client system 530) may indicate that he or she likes the concept represented by the concept node 604 by clicking or selecting a "Like" icon, which may cause the user's client system 530 to send to social-networking system 560 a message indicating the user's liking of the concept associated with the concept-profile page. In response to the message, social-networking system 560 may create an edge 606 between user node 602 associated with the user and concept node 604, as illustrated by "like" edge 606 between the user and concept node 604. In particular embodiments, social-networking system 560 may store an edge 606 in one or more data stores. In particular embodiments, an edge 606 may be automatically formed by social-networking system 560 in response to a particular user action. As an example and not by way of limitation, if a first user uploads a picture, watches a movie, or listens to a song, an edge 606 may be formed between user node 602 corresponding to the first user and concept nodes 604 corresponding to those concepts. Although this disclosure describes forming particular edges 606 in particular manners, this disclosure contemplates forming any suitable edges 606 in any suitable manner.

In particular embodiments, social-networking system 560 may determine the social-graph affinity (which may be referred to herein as "affinity") of various social-graph entities for each other. Affinity may represent the strength of a relationship or level of interest between particular objects associated with the online social network, such as users, concepts, content, actions, advertisements, other objects associated with the online social network, or any suitable combination thereof. Affinity may also be determined with respect to objects associated with third-party systems 570 or other suitable systems. An overall affinity for a social-graph entity for each user, subject matter, or type of content may be established. The overall affinity may change based on continued monitoring of the actions or relationships associated with the social-graph entity. Although this disclosure describes determining particular affinities in a particular manner, this disclosure contemplates determining any suitable affinities in any suitable manner.

In particular embodiments, social-networking system 560 may measure or quantify social-graph affinity using an affinity coefficient (which may be referred to herein as "coefficient"). The coefficient may represent or quantify the strength of a relationship between particular objects associated with the online social network. The coefficient may also represent a probability or function that measures a predicted probability that a user will perform a particular action based on the user's interest in the action. In this way, a user's future actions may be predicted based on the user's prior actions, where the coefficient may be calculated at least in part on the history of the user's actions. Coefficients may be used to predict any number of actions, which may be within or outside of the online social network. As an example and not by way of limitation, these actions may include various types of communications, such as sending messages, posting content, or commenting on content; various types of observation actions, such as accessing or viewing profile pages, media, or other suitable content; various types of coincidence information about two or more social-graph entities, such as being in the same group, tagged in the same photograph, checked-in at the same location, or attending the same event; or other suitable actions. Although this disclosure describes measuring affinity in a particular manner, this disclosure contemplates measuring affinity in any suitable manner.

In particular embodiments, social-networking system 560 may use a variety of factors to calculate a coefficient. These factors may include, for example, user actions, types of relationships between objects, location information, other suitable factors, or any combination thereof. In particular embodiments, different factors may be weighted differently when calculating the coefficient. The weights for each factor may be static or the weights may change according to, for example, the user, the type of relationship, the type of action, the user's location, and so forth. Ratings for the factors may be combined according to their weights to determine an overall coefficient for the user. As an example and not by way of limitation, particular user actions may be assigned both a rating and a weight while a relationship associated with the particular user action is assigned a rating and a correlating weight (e.g., so the weights total 100%). To calculate the coefficient of a user towards a particular object, the rating assigned to the user's actions may comprise, for example, 60% of the overall coefficient, while the relationship between the user and the object may comprise 40% of the overall coefficient. In particular embodiments, the social-networking system 560 may consider a variety of variables when determining weights for various factors used to calculate a coefficient, such as, for example, the time since information was accessed, decay factors, frequency of access, relationship to information or relationship to the object about which information was accessed, relationship to social-graph entities connected to the object, short- or long-term averages of user actions, user feedback, other suitable variables, or any combination thereof. As an example and not by way of limitation, a coefficient may include a decay factor that causes the strength of the signal provided by particular actions to decay with time, such that more recent actions are more relevant when calculating the coefficient. The ratings and weights may be continuously updated based on continued tracking of the actions upon which the coefficient is based. Any type of process or algorithm may be employed for assigning, combining, averaging, and so forth the ratings for each factor and the weights assigned to the factors. In particular embodiments, social-networking system 560 may determine coefficients using machine-learning algorithms trained on historical actions and past user responses, or data farmed from users by exposing them to various options and measuring responses. Although this disclosure describes calculating coefficients in a particular manner, this disclosure contemplates calculating coefficients in any suitable manner.

In particular embodiments, social-networking system 560 may calculate a coefficient based on a user's actions. Social-networking system 560 may monitor such actions on the online social network, on a third-party system 570, on other suitable systems, or any combination thereof. Any suitable type of user actions may be tracked or monitored. Typical user actions include viewing profile pages, creating or posting content, interacting with content, tagging or being tagged in images, joining groups, listing and confirming attendance at events, checking-in at locations, liking particular pages, creating pages, and performing other tasks that facilitate social action. In particular embodiments, social-networking system 560 may calculate a coefficient based on the user's actions with particular types of content. The content may be associated with the online social network, a third-party system 570, or another suitable system. The content may include users, profile pages, posts, news stories, headlines, instant messages, chat room conversations, emails, advertisements, pictures, video, music, other suitable objects, or any combination thereof. Social-networking system 560 may analyze a user's actions to determine whether one or more of the actions indicate an affinity for subject matter, content, other users, and so forth. As an example and not by way of limitation, if a user frequently posts content related to "coffee" or variants thereof, social-networking system 560 may determine the user has a high coefficient with respect to the concept "coffee". Particular actions or types of actions may be assigned a higher weight and/or rating than other actions, which may affect the overall calculated coefficient. As an example and not by way of limitation, if a first user emails a second user, the weight or the rating for the action may be higher than if the first user simply views the user-profile page for the second user.

In particular embodiments, social-networking system 560 may calculate a coefficient based on the type of relationship between particular objects. Referencing the social graph 600, social-networking system 560 may analyze the number and/or type of edges 606 connecting particular user nodes 602 and concept nodes 604 when calculating a coefficient. As an example and not by way of limitation, user nodes 602 that are connected by a spouse-type edge (representing that the two users are married) may be assigned a higher coefficient than a user nodes 602 that are connected by a friend-type edge. In other words, depending upon the weights assigned to the actions and relationships for the particular user, the overall affinity may be determined to be higher for content about the user's spouse than for content about the user's friend. In particular embodiments, the relationships a user has with another object may affect the weights and/or the ratings of the user's actions with respect to calculating the coefficient for that object. As an example and not by way of limitation, if a user is tagged in a first photo, but merely likes a second photo, social-networking system 560 may determine that the user has a higher coefficient with respect to the first photo than the second photo because having a tagged-in-type relationship with content may be assigned a higher weight and/or rating than having a like-type relationship with content. In particular embodiments, social-networking system 560 may calculate a coefficient for a first user based on the relationship one or more second users have with a particular object. In other words, the connections and coefficients other users have with an object may affect the first user's coefficient for the object. As an example and not by way of limitation, if a first user is connected to or has a high coefficient for one or more second users, and those second users are connected to or have a high coefficient for a particular object, social-networking system 560 may determine that the first user should also have a relatively high coefficient for the particular object. In particular embodiments, the coefficient may be based on the degree of separation between particular objects. The lower coefficient may represent the decreasing likelihood that the first user will share an interest in content objects of the user that is indirectly connected to the first user in the social graph 600. As an example and not by way of limitation, social-graph entities that are closer in the social graph 600 (i.e., fewer degrees of separation) may have a higher coefficient than entities that are further apart in the social graph 600.

In particular embodiments, social-networking system 560 may calculate a coefficient based on location information. Objects that are geographically closer to each other may be considered to be more related or of more interest to each other than more distant objects. In particular embodiments, the coefficient of a user towards a particular object may be based on the proximity of the object's location to a current location associated with the user (or the location of a client system 530 of the user). A first user may be more interested in other users or concepts that are closer to the first user. As an example and not by way of limitation, if a user is one mile from an airport and two miles from a gas station, social-networking system 560 may determine that the user has a higher coefficient for the airport than the gas station based on the proximity of the airport to the user.

In particular embodiments, social-networking system 560 may perform particular actions with respect to a user based on coefficient information. Coefficients may be used to predict whether a user will perform a particular action based on the user's interest in the action. A coefficient may be used when generating or presenting any type of objects to a user, such as advertisements, search results, news stories, media, messages, notifications, or other suitable objects. The coefficient may also be utilized to rank and order such objects, as appropriate. In this way, social-networking system 560 may provide information that is relevant to user's interests and current circumstances, increasing the likelihood that they will find such information of interest. In particular embodiments, social-networking system 560 may generate content based on coefficient information. Content objects may be provided or selected based on coefficients specific to a user. As an example and not by way of limitation, the coefficient may be used to generate media for the user, where the user may be presented with media for which the user has a high overall coefficient with respect to the media object. As another example and not by way of limitation, the coefficient may be used to generate advertisements for the user, where the user may be presented with advertisements for which the user has a high overall coefficient with respect to the advertised object. In particular embodiments, social-networking system 560 may generate search results based on coefficient information. Search results for a particular user may be scored or ranked based on the coefficient associated with the search results with respect to the querying user. As an example and not by way of limitation, search results corresponding to objects with higher coefficients may be ranked higher on a search-results page than results corresponding to objects having lower coefficients.

In particular embodiments, social-networking system 560 may calculate a coefficient in response to a request for a coefficient from a particular system or process. To predict the likely actions a user may take (or may be the subject of) in a given situation, any process may request a calculated coefficient for a user. The request may also include a set of weights to use for various factors used to calculate the coefficient. This request may come from a process running on the online social network, from a third-party system 570 (e.g., via an API or other communication channel), or from another suitable system. In response to the request, social-networking system 560 may calculate the coefficient (or access the coefficient information if it has previously been calculated and stored). In particular embodiments, social-networking system 560 may measure an affinity with respect to a particular process. Different processes (both internal and external to the online social network) may request a coefficient for a particular object or set of objects. Social-networking system 560 may provide a measure of affinity that is relevant to the particular process that requested the measure of affinity. In this way, each process receives a measure of affinity that is tailored for the different context in which the process will use the measure of affinity.

In connection with social-graph affinity and affinity coefficients, particular embodiments may utilize one or more systems, components, elements, functions, methods, operations, or steps disclosed in U.S. patent application Ser. No. 11/503,093, filed 11 Aug. 2006, U.S. patent application Ser. No. 12/977,027, filed 22 Dec. 2010, U.S. patent application Ser. No. 12/978,265, filed 23 Dec. 2010, and U.S. patent application Ser. No. 13/632,869, filed 1 Oct. 2012, each of which is incorporated by reference.

In particular embodiments, one or more of the content objects of the online social network may be associated with a privacy setting. The privacy settings (or "access settings") for an object may be stored in any suitable manner, such as, for example, in association with the object, in an index on an authorization server, in another suitable manner, or any combination thereof. A privacy setting of an object may specify how the object (or particular information associated with an object) can be accessed (e.g., viewed or shared) using the online social network. Where the privacy settings for an object allow a particular user to access that object, the object may be described as being "visible" with respect to that user. As an example and not by way of limitation, a user of the online social network may specify privacy settings for a user-profile page that identify a set of users that may access the work experience information on the user-profile page, thus excluding other users from accessing the information. In particular embodiments, the privacy settings may specify a "blocked list" of users that should not be allowed to access certain information associated with the object. In other words, the blocked list may specify one or more users or entities for which an object is not visible. As an example and not by way of limitation, a user may specify a set of users that may not access photos albums associated with the user, thus excluding those users from accessing the photo albums (while also possibly allowing certain users not within the set of users to access the photo albums). In particular embodiments, privacy settings may be associated with particular social-graph elements. Privacy settings of a social-graph element, such as a node or an edge, may specify how the social-graph element, information associated with the social-graph element, or content objects associated with the social-graph element can be accessed using the online social network. As an example and not by way of limitation, a particular concept node 604 corresponding to a particular photo may have a privacy setting specifying that the photo may only be accessed by users tagged in the photo and their friends. In particular embodiments, privacy settings may allow users to opt in or opt out of having their actions logged by social-networking system 560 or shared with other systems (e.g., third-party system 570). In particular embodiments, the privacy settings associated with an object may specify any suitable granularity of permitted access or denial of access. As an example and not by way of limitation, access or denial of access may be specified for particular users (e.g., only me, my roommates, and my boss), users within a particular degrees-of-separation (e.g., friends, or friends-of-friends), user groups (e.g., the gaming club, my family), user networks (e.g., employees of particular employers, students or alumni of particular university), all users ("public"), no users ("private"), users of third-party systems 570, particular applications (e.g., third-party applications, external websites), other suitable users or entities, or any combination thereof. Although this disclosure describes using particular privacy settings in a particular manner, this disclosure contemplates using any suitable privacy settings in any suitable manner.

In particular embodiments, one or more servers 462 may be authorization/privacy servers for enforcing privacy settings. In response to a request from a user (or other entity) for a particular object stored in a data store 464, social-networking system 560 may send a request to the data store 464 for the object. The request may identify the user associated with the request and may only be sent to the user (or a client system 530 of the user) if the authorization server determines that the user is authorized to access the object based on the privacy settings associated with the object. If the requesting user is not authorized to access the object, the authorization server may prevent the requested object from being retrieved from the data store 464, or may prevent the requested object from being sent to the user. In the search query context, an object may only be generated as a search result if the querying user is authorized to access the object. In other words, the object must have a visibility that is visible to the querying user. If the object has a visibility that is not visible to the user, the object may be excluded from the search results. Although this disclosure describes enforcing privacy settings in a particular manner, this disclosure contemplates enforcing privacy settings in any suitable manner.

Figure 7:
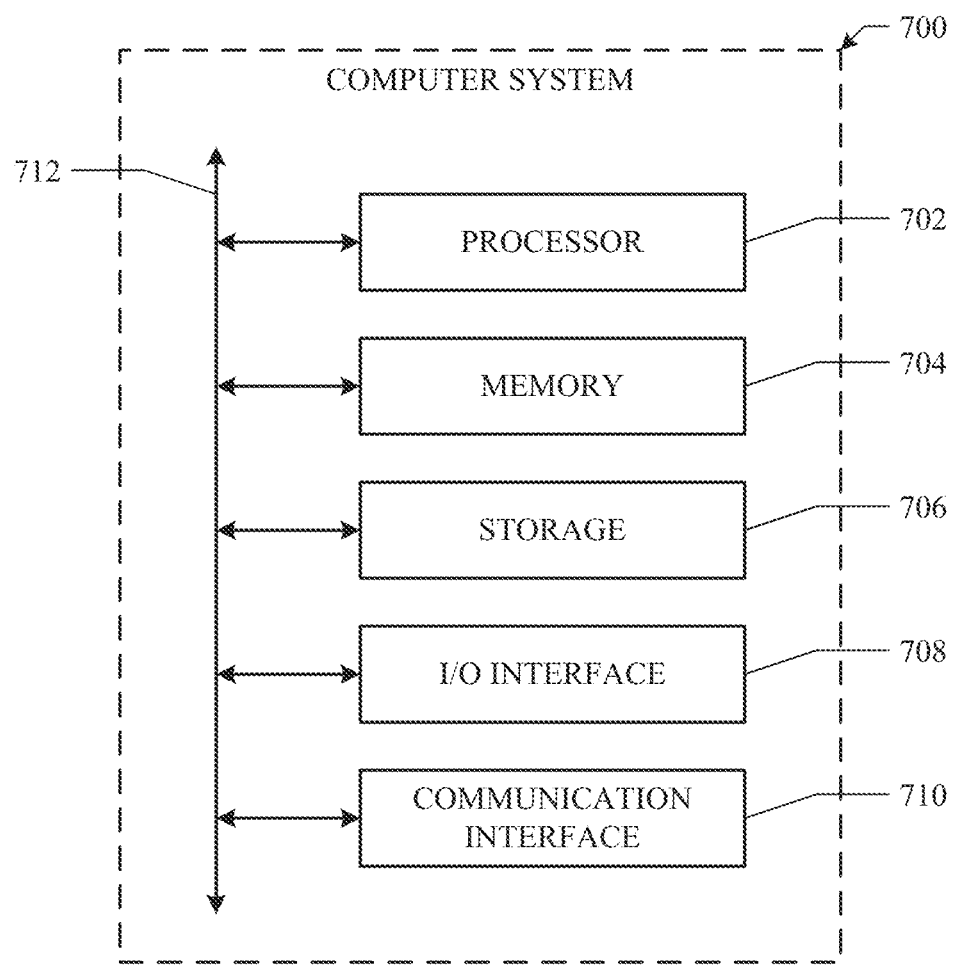
FIG. 7 illustrates an example computer system.

FIG. 7 illustrates an example computer system 700. In particular embodiments, one or more computer systems 700 perform one or more steps of one or more methods described or illustrated herein. In particular embodiments, one or more computer systems 700 provide functionality described or illustrated herein. In particular embodiments, software running on one or more computer systems 700 performs one or more steps of one or more methods described or illustrated herein or provides functionality described or illustrated herein. Particular embodiments include one or more portions of one or more computer systems 700. Herein, reference to a computer system may encompass a computing device, and vice versa, where appropriate. Moreover, reference to a computer system may encompass one or more computer systems, where appropriate.

This disclosure contemplates any suitable number of computer systems 700. This disclosure contemplates computer system 700 taking any suitable physical form. As example and not by way of limitation, computer system 700 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 700 may include one or more computer systems 700; be unitary or distributed; span multiple locations; span multiple machines; span multiple data centers; or reside in a cloud, which may include one or more cloud components in one or more networks. Where appropriate, one or more computer systems 700 may perform without substantial spatial or temporal limitation one or more steps of one or more methods described or illustrated herein. As an example and not by way of limitation, one or more computer systems 700 may perform in real time or in batch mode one or more steps of one or more methods described or illustrated herein. One or more computer systems 700 may perform at different times or at different locations one or more steps of one or more methods described or illustrated herein, where appropriate.

In particular embodiments, computer system 700 includes a processor 702, memory 704, storage 706, an input/output (I/O) interface 708, a communication interface 710, and a bus 712. Although this disclosure describes and illustrates a particular computer system having a particular number of particular components in a particular arrangement, this disclosure contemplates any suitable computer system having any suitable number of any suitable components in any suitable arrangement.

In particular embodiments, processor 702 includes hardware for executing instructions, such as those making up a computer program. As an example and not by way of limitation, to execute instructions, processor 702 may retrieve (or fetch) the instructions from an internal register, an internal cache, memory 704, or storage 706; decode and execute them; and then write one or more results to an internal register, an internal cache, memory 704, or storage 706. In particular embodiments, processor 702 may include one or more internal caches for data, instructions, or addresses. This disclosure contemplates processor 702 including any suitable number of any suitable internal caches, where appropriate. As an example and not by way of limitation, processor 702 may include one or more instruction caches, one or more data caches, and one or more translation lookaside buffers (TLBs). Instructions in the instruction caches may be copies of instructions in memory 704 or storage 706, and the instruction caches may speed up retrieval of those instructions by processor 702. Data in the data caches may be copies of data in memory 704 or storage 706 for instructions executing at processor 702 to operate on; the results of previous instructions executed at processor 702 for access by subsequent instructions executing at processor 702 or for writing to memory 704 or storage 706; or other suitable data. The data caches may speed up read or write operations by processor 702. The TLBs may speed up virtual-address translation for processor 702. In particular embodiments, processor 702 may include one or more internal registers for data, instructions, or addresses. This disclosure contemplates processor 702 including any suitable number of any suitable internal registers, where appropriate. Where appropriate, processor 702 may include one or more arithmetic logic units (ALUs); be a multi-core processor; or include one or more processors 702. Although this disclosure describes and illustrates a particular processor, this disclosure contemplates any suitable processor.

In particular embodiments, memory 704 includes main memory for storing instructions for processor 702 to execute or data for processor 702 to operate on. As an example and not by way of limitation, computer system 700 may load instructions from storage 706 or another source (such as, for example, another computer system 700) to memory 704. Processor 702 may then load the instructions from memory 704 to an internal register or internal cache. To execute the instructions, processor 702 may retrieve the instructions from the internal register or internal cache and decode them. During or after execution of the instructions, processor 702 may write one or more results (which may be intermediate or final results) to the internal register or internal cache. Processor 702 may then write one or more of those results to memory 704. In particular embodiments, processor 702 executes only instructions in one or more internal registers or internal caches or in memory 704 (as opposed to storage 706 or elsewhere) and operates only on data in one or more internal registers or internal caches or in memory 704 (as opposed to storage 706 or elsewhere). One or more memory buses (which may each include an address bus and a data bus) may couple processor 702 to memory 704. Bus 712 may include one or more memory buses, as described below. In particular embodiments, one or more memory management units (MMUs) reside between processor 702 and memory 704 and facilitate accesses to memory 704 requested by processor 702. In particular embodiments, memory 704 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 704 may include one or more memories 704, where appropriate. Although this disclosure describes and illustrates particular memory, this disclosure contemplates any suitable memory.

In particular embodiments, storage 706 includes mass storage for data or instructions. As an example and not by way of limitation, storage 706 may include a hard disk drive (HDD), a floppy disk drive, flash memory, an optical disc, a magneto-optical disc, magnetic tape, or a Universal Serial Bus (USB) drive or a combination of two or more of these. Storage 706 may include removable or non-removable (or fixed) media, where appropriate. Storage 706 may be internal or external to computer system 700, where appropriate. In particular embodiments, storage 706 is non-volatile, solid-state memory. In particular embodiments, storage 706 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 706 taking any suitable physical form. Storage 706 may include one or more storage control units facilitating communication between processor 702 and storage 706, where appropriate. Where appropriate, storage 706 may include one or more storages 706. Although this disclosure describes and illustrates particular storage, this disclosure contemplates any suitable storage.

In particular embodiments, I/O interface 708 includes hardware, software, or both, providing one or more interfaces for communication between computer system 700 and one or more I/O devices. Computer system 700 may include one or more of these I/O devices, where appropriate. One or more of these I/O devices may enable communication between a person and computer system 700. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 708 for them. Where appropriate, I/O interface 708 may include one or more device or software drivers enabling processor 702 to drive one or more of these I/O devices. I/O interface 708 may include one or more I/O interfaces 708, where appropriate. Although this disclosure describes and illustrates a particular I/O interface, this disclosure contemplates any suitable I/O interface.

In particular embodiments, communication interface 710 includes hardware, software, or both providing one or more interfaces for communication (such as, for example, packet-based communication) between computer system 700 and one or more other computer systems 700 or one or more networks. As an example and not by way of limitation, communication interface 710 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 710 for it. As an example and not by way of limitation, computer system 700 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 700 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network), or other suitable wireless network or a combination of two or more of these. Computer system 700 may include any suitable communication interface 710 for any of these networks, where appropriate. Communication interface 710 may include one or more communication interfaces 710, where appropriate. Although this disclosure describes and illustrates a particular communication interface, this disclosure contemplates any suitable communication interface.

In particular embodiments, bus 712 includes hardware, software, or both coupling components of computer system 700 to each other. As an example and not by way of limitation, bus 712 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or another suitable bus or a combination of two or more of these. Bus 712 may include one or more buses 712, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative. Additionally, although this disclosure describes or illustrates particular embodiments as providing particular advantages, particular embodiments may provide none, some, or all of these advantages.

What is claimed is:

1. A method comprising, by one or more computing devices:
  by one or more of the computing devices, accessing a video;
  by one or more of the computing devices, detecting one or more objects in one or more frames of the video;
  by one or more of the computing devices, identifying one or more of the detected objects;
  by one or more of the computing devices, determining a relevance score for each of the one or more of the identified objects with respect to a user the video is to be presented to;
  by one or more of the computing devices, selecting one or more frames of the video based on the determined relevance scores for the identified objects in the frames, wherein each selected frame depicts an identified object with a relevance score greater than a threshold relevance score; and
  by one or more of the computing devices, providing for presentation to the user one or more of the selected frames of the video.

2. The method of claim 1, wherein each of one or more of the objects comprises another user, a face, an animal, or a physical object.

3. The method of claim 1, wherein determining the relevance score for each of the identified objects with respect to the user is based on social-networking information associated with the user and social-networking information associated with the identified object.

4. The method of claim 1, wherein:
the user is a user of an online social network;
the online social network comprises a social graph comprising a plurality of nodes and a plurality of edges connecting the nodes, each of the edges between two of the nodes representing a single degree of separation between them, the nodes;
a first node corresponds to the user; and
one or more second nodes correspond to the one or more identified objects, respectively.

5. The method of claim 4, wherein determining the relevance score for each of the one or more of the identified objects with respect to the user is based on an affinity coefficient between the first node corresponding to the user and the second node corresponding to the identified object.

6. The method of claim 4, wherein determining the relevance score for each of the one or more of the identified objects with respect to the user is based on a degree of separation between the first node corresponding to the user and the second node corresponding to the identified object.

7. The method of claim 1, wherein determining the relevance score for each of the one or more of the identified objects with respect to the user is based on a similarity metric between a feature vector representing the user and a feature vector representing the identified object.

8. The method of claim 1, wherein:
the method further comprises determining a frame relevance-score for each of the one or more frames of the video based on the relevance scores for each identified object in the frame; and
one or more frames of the video are selected based on the respective frame relevance-score of the one or more frames.

9. The method of claim 8, wherein the frame relevance-score for each of the one or more frames of the video is determined based on a sum of the relevance scores for each identified object in the frame.

10. The method of claim 8, wherein the frame relevance-score for each of the one or more frames of the video is determined based on the object in the frame with the highest relevance score.

11. One or more computer-readable non-transitory storage media embodying software that is operable when executed to:
access a video;
detect one or more objects in one or more frames of the video;
identify one or more of the detected objects;
determine a relevance score for each of the one or more of the identified objects with respect to a user the video is to be presented to;
select one or more frames of the video based on the determined relevance scores for the identified objects in the frames, wherein each selected frame depicts an identified object with a relevance score greater than a threshold relevance score; and
provide for presentation to the user one or more of the selected frames of the video.

12. The media of claim 11, wherein each of one or more of the objects comprises another user, a face, an animal, or a physical object.

13. The media of claim 11, wherein determining the relevance score for each of the identified objects with respect to the user is based on social-networking information associated with the user and social-networking information associated with the identified object.

14. The media of claim 11, wherein:
the user is a user of an online social network;
the online social network comprises a social graph comprising a plurality of nodes and a plurality of edges connecting the nodes, each of the edges between two of the nodes representing a single degree of separation between them, the nodes;
a first node corresponds to the user; and
one or more second nodes correspond to the one or more identified objects, respectively.

15. The media of claim 14, wherein determining the relevance score for each of the one or more of the identified objects with respect to the user is based on an affinity coefficient between the first node corresponding to the user and the second node corresponding to the identified object.

16. The media of claim 14, wherein determining the relevance score for each of the one or more of the identified objects with respect to the user is based on a degree of separation between the first node corresponding to the user and the second node corresponding to the identified object.

17. The media of claim 11, wherein determining the relevance score for each of the one or more of the identified objects with respect to the user is based on a similarity metric between a feature vector representing the user and a feature vector representing the identified object.

18. A system comprising: one or more processors; and a memory coupled to the processors and comprising instructions operable when executed by the processors to cause the processors to:
access a video;
detect one or more objects in one or more frames of the video;
identify one or more of the detected objects;
determine a relevance score for each of the one or more of the identified objects with respect to a user the video is to be presented to;
select one or more frames of the video based on the determined relevance scores for the identified objects in the frames, wherein each selected frame depicts an identified object with a relevance score greater than a threshold relevance score; and
provide for presentation to the user one or more of the selected frames of the video.

* * * * *